(12) United States Patent
Saney et al.

(10) Patent No.: US 11,780,331 B2
(45) Date of Patent: Oct. 10, 2023

(54) METHODS AND SYSTEMS FOR DISPLAYING VISUAL CONTENT ON A MOTOR VEHICLE AND METHOD FOR PROVIDING A MOTOR VEHICLE

(71) Applicant: MERCEDES-BENZ GROUP AG, Stuttgart (DE)

(72) Inventors: Kavita Saney, Fremont, CA (US); Kevin Gee, Union City, CA (US); Sarah Plewe, Foster City, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/009,367

(22) PCT Filed: May 25, 2021

(86) PCT No.: PCT/EP2021/063783
§ 371 (c)(1),
(2) Date: Dec. 9, 2022

(87) PCT Pub. No.: WO2021/249752
PCT Pub. Date: Dec. 16, 2021

(65) Prior Publication Data
US 2023/0191910 A1 Jun. 22, 2023

(30) Foreign Application Priority Data
Jun. 10, 2020 (GB) ................... 2008759

(51) Int. Cl.
*B60K 35/00* (2006.01)
(52) U.S. Cl.
CPC ........ *B60K 35/00* (2013.01); *B60K 2370/161* (2019.05); *B60K 2370/166* (2019.05); *B60K 2370/334* (2019.05); *B60K 2370/785* (2019.05)

(58) Field of Classification Search
CPC ............. B60K 35/00; B60K 2370/161; B60K 2370/166; B60K 2370/334; B60K 2370/785
(Continued)

(56) References Cited

U.S. PATENT DOCUMENTS 9,232,200 B2 * 1/2016 Norman ................. B60K 35/00
9,799,245 B2 10/2017 Kriezman
(Continued)

FOREIGN PATENT DOCUMENTS

WO WO-2015160415 A2 * 10/2015 ........... G06K 9/6278
WO 2018191866 A1 10/2018
(Continued)

OTHER PUBLICATIONS

International Search Report and Written Opinion dated Aug. 9, 2021 in related/corresponding International Application No. PCT/EP2021/063783.
(Continued)

*Primary Examiner* — Tuan C To
(74) *Attorney, Agent, or Firm* — PATENT PORTFOLIO BUILDERS PLLC

(57) ABSTRACT

A method for displaying visual contents on a motor vehicle involves a computing system receiving user request data from a mobile electronic device. Visual content data representing the visual content is determined by the computing system depending on the user request. A window is selected by the computing system from at least two windows of the motor vehicle and control data is generated by the computing system depending on the visual content data and on the selected window. A projection arrangement of the motor vehicle is controlled depending on the control data to project the visual content on the selected window.

6 Claims, 6 Drawing Sheets

(58) Field of Classification Search
USPC .......................................................... 701/36
See application file for complete search history.

(56) References Cited

U.S. PATENT DOCUMENTS

| | | | |
|---|---|---|---|
| 10,502,962 B2* | 12/2019 | Fujita | B60K 35/00 |
| 11,449,294 B2* | 9/2022 | Lee | G06F 3/165 |
| 2006/0103590 A1* | 5/2006 | Divon | G08B 5/36 |
| | | | 455/344 |
| 2010/0321170 A1 | 12/2010 | Cooper et al. | |
| 2012/0089273 A1 | 4/2012 | Seder et al. | |
| 2018/0136643 A1* | 5/2018 | Tao | G05D 1/0022 |
| 2018/0240344 A1 | 8/2018 | Matthiesen et al. | |
| 2018/0308454 A1* | 10/2018 | Gusikhin | G02B 27/017 |
| 2018/0338094 A1* | 11/2018 | Fujita | G06V 20/58 |
| 2019/0098268 A1* | 3/2019 | Garg | G09F 21/04 |
| 2019/0202348 A1 | 7/2019 | Elangovan et al. | |
| 2020/0223352 A1* | 7/2020 | Toshio Kimura | B60Q 1/5037 |
| 2021/0190523 A1* | 6/2021 | Stumpf | G06V 20/56 |
| 2021/0197847 A1* | 7/2021 | Galliano, III | G06T 19/006 |

FOREIGN PATENT DOCUMENTS

| | | | | |
|---|---|---|---|---|
| WO | WO-2018191886 A1 * | 10/2018 | | B60Q 1/50 |
| WO | 2019106696 A2 | 6/2019 | | |
| WO | WO-2019106696 A2 * | 6/2019 | | G06Q 30/02 |

OTHER PUBLICATIONS

Search Report dated Dec. 3, 2020 in related/corresponding GB Application No. 2008759.9.

* cited by examiner

METHODS AND SYSTEMS FOR DISPLAYING VISUAL CONTENT ON A MOTOR VEHICLE AND METHOD FOR PROVIDING A MOTOR VEHICLE

FIELD OF THE INVENTION

Methods and systems for displaying visual content on a motor vehicle and methods for providing a motor vehicle to a user are provided.

BACKGROUND INFORMATION

U.S. Pat. No. 9,799,245 B2 describes a system for displaying visually sensible patterns onto a surface of a vehicle including a display control subsystem responsive to an operational state of the vehicle, and a display device, operative in response to an input from the display control subsystem, to display a visually sensible pattern onto the surface. Preferably, the visually sensible pattern is visible from the exterior of the vehicle.

Exemplary embodiments are directed to a method and a system for displaying visual content on the motor vehicle and a method for providing a motor vehicle to a user, which allow the user to identify the motor vehicle among others in a more convenient way.

Exemplary embodiments are also directed to a method and a system for displaying visual content on the motor vehicle and a method for providing a motor vehicle to a user, which allow the user to confirm that a specific vehicle is provided without another person providing the vehicle.

Exemplary embodiments are further directed to a method and a system for displaying visual content on the motor vehicle and a method for providing a motor vehicle to a user, which allow the user to customize the visual content.

SUMMARY OF THE INVENTION

According to a first independent aspect of the invention, a method for displaying visual content on a motor vehicle, in particular a surface of the motor vehicle, in particular a window surface of the motor vehicle, is provided. According to the method, user request data is received from a computing system from a mobile electronic device, visual content data representing the visual content is determined by the computing system depending on the user request and a window is selected by the computing system from at least two windows of the motor vehicle. Control data is generated by the computing system depending on the visual content data and depending on the selected window. A projection arrangement of the motor vehicle is controlled, in particular by a computing system, depending on the control data to project the visual content on the selected window, in particular on a surface of the selected window.

According to a second independent aspect of the invention, a system for displaying visual content on a motor vehicle is provided. The system comprises a computing system with a communication interface, which is configured to receive user request data from a mobile electronic device. The computing system is configured to determine visual content data representing the visual content depending on the user request and to select a window from at least two windows of the motor vehicle and to generate control data depending on the visual content data and on the selected window. The system for displaying visual content further comprises a projection arrangement for or of the motor vehicle, which is configured, and in particular mounted or mountable to the vehicle, in order to project the visual content on the selected window depending on the control data.

The system for displaying visual content according to the second aspect of the invention may be configured or programmed to carry out a method for displaying visual content according to the first aspect of the invention or the system carries out such a method.

According to a third independent aspect of the invention, a method for providing a motor vehicle to a user is provided. According to the method, user request data is received by a computing system from a mobile electronic device. Visual content data representing the visual content is determined by the computing system depending on the user request. A position signal representing a position of the mobile electronic device is received by the computing system. The motor vehicle is controlled by an electronic vehicle guidance system to move automatically to a boarding position depending on the position signal or the position of the mobile electronic device. A window is selected by the computing system from at least two windows of the motor vehicle. Control data is generated by the computing system depending on the visual content data and on the selected window. A projection arrangement of the motor vehicle is controlled depending on the control data to project the visual content on the selected window.

According to a method for providing the motor vehicle to a user according to the third aspect of the invention, the motor vehicle may, for example, first move to the boarding position and then select the window of the at least two windows of the motor vehicle, for example, depending on an updated position of the mobile electronic device.

BRIEF DESCRIPTION OF THE DRAWINGS

Further advantages, features, and details derive from the following description of preferred embodiments as well as from the drawings. The features and feature combinations previously mentioned in the description as well as the features and feature combinations mentioned in the following description of the figures and/or shown in the figures alone can be employed not only in the respectively indicated combination but also in any other combination or taken alone without leaving the scope of the invention.

In the drawings.

DETAILED DESCRIPTION

In the figures the same elements or elements having the same function are indicated by the same reference signs.

Figure 1:
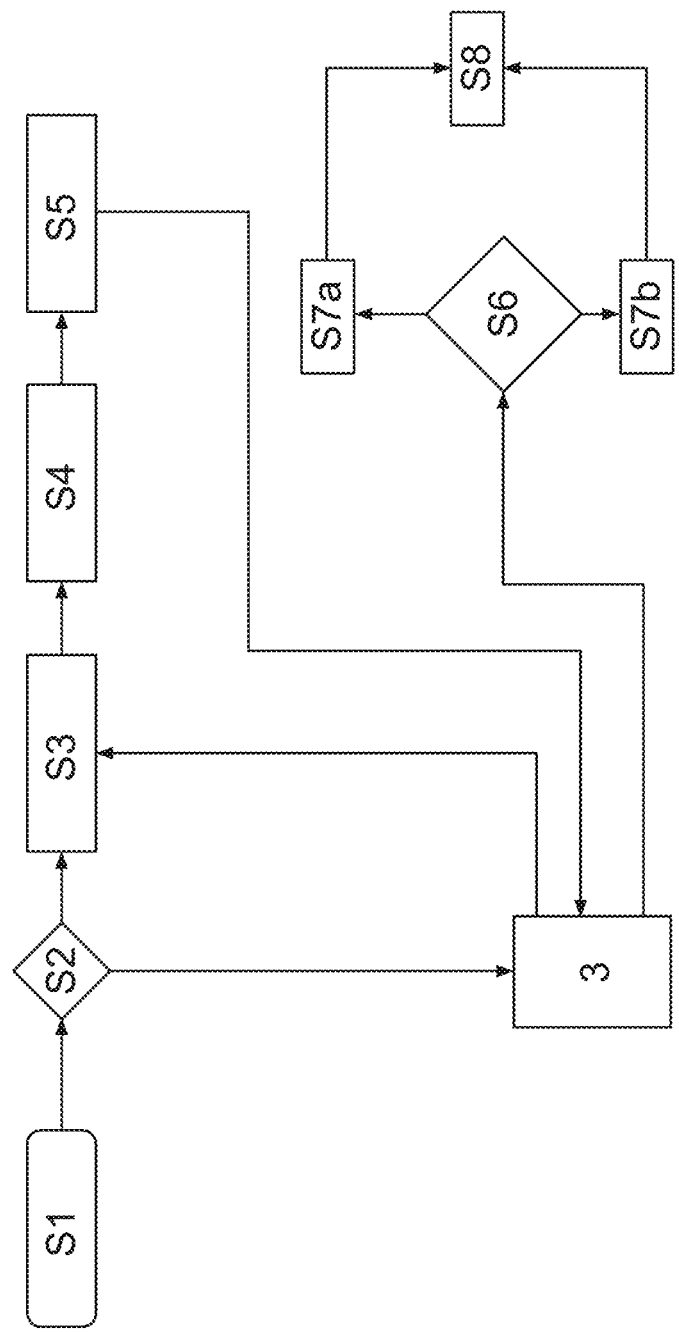
FIG. 1 shows a schematic flow diagram of an exemplary embodiment of a method for displaying visual content.
Figure 2:
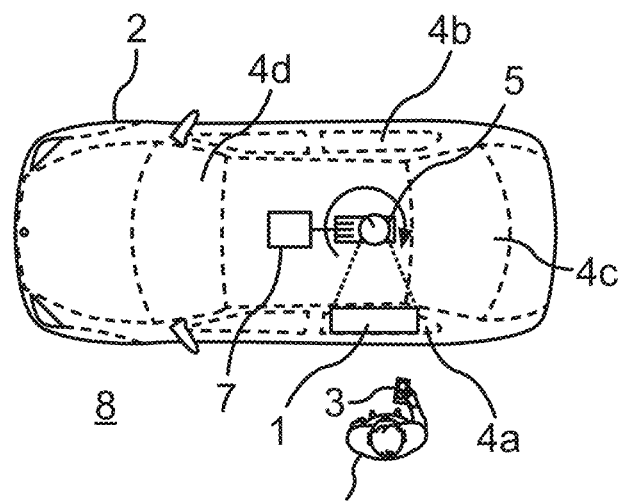
FIG. 2 shows an exemplary embodiment of a system for displaying visual content in a first situation.
Figure 3:
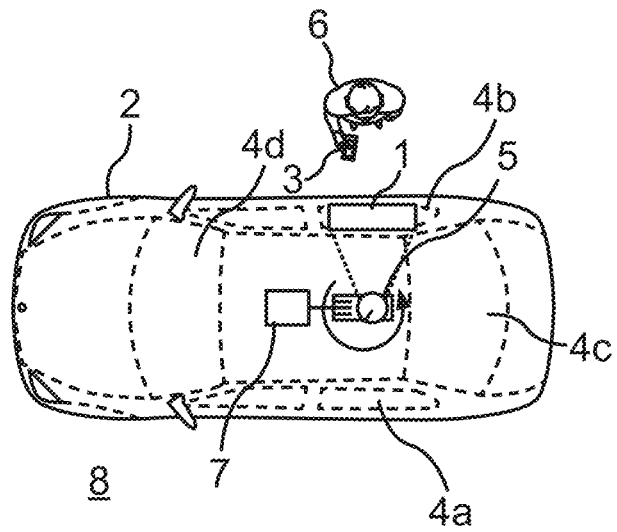
FIG. 3 shows the system of FIG. 2 in a second situation.

FIG. 1 shows a schematic flow diagram of an exemplary implementation of a method for displaying visual content 1 (see FIG. 2 to FIG. 4 and FIG. 7) and/or of a method for providing a motor vehicle 2 (see FIG. 2 and FIG. 3). FIG. 2 and FIG. 3 show a motor vehicle 2 and a user 6 with a mobile electronic device 3 as well as an exemplary embodiment of a system 8 for displaying visual content 1 on the motor vehicle 2.

In step S1 of the method, a user 6 may input a user input concerning the visual content 1 to a user interface (not shown in the figures) of the mobile electronic device 3. The user request may comprise a request of the motor vehicle 2, for example in the context of a rental or sharing service. The computing system 7 may determine visual content data representing the visual content 1 depending on the user request received from the mobile electronic device 3.

In an embodiment, the user request data comprises data concerning an intended use of the motor vehicle 2, such as an expected route or time of use of the motor vehicle 2. The mobile electronic device 3 may transmit the user request, for example in a wireless manner, to a computing system 7 of the system 8 and/or of the motor vehicle 2. In another embodiment, the computing system 7 or parts of the computing system 7 may be arranged externally to the motor vehicle 2, for example in a remote or server computer system.

The computing system 7 may comprise one or more individual computing units which may or may not be spatially distributed. In an embodiment, the computing system 7 comprises one or more computing units of the motor vehicle 2. In another embodiment, the computing system 7 comprises, in addition or alternatively, one or more remote or server computing units (not shown in the figures). The one or more remote or server computing units may communicate wirelessly with other computing units of the computing system 7, for example of the motor vehicle 2.

In step S2, the computing system 7 may determine whether the user 6 has provided a user input concerning the visual content 1, for example in order to customize the visual content 1, to the mobile electronic device 3 and the mobile electronic device 3 has generated the user request data depending on the user input.

In step S3, the computing system 7 may determine visual content data representing the visual content 1 depending on the user request. To this end, the computing system 7 may select an appropriate visual content 1 depending on the specific situation or depending on the user request data and, in particular, depending on the user input, if available. Several variants of the visual content 1 may, for example, be stored on a database (not shown) of the motor vehicle 2 or the computing system 7.

In step S4, the motor vehicle 2 may be controlled by an electronic vehicle guidance system (not shown in the figures) of the motor vehicle 2 to move automatically to a boarding position depending on a position signal or on a position of the mobile electronic device 3. To this end, the mobile electronic device 3 may generate the position signal representing the position of the mobile electronic device 3 and transmit it to the computing system 7. Alternatively, or additionally, the electronic vehicle guidance system may determine the boarding position depending on map data retrieved from a map database, for example of the computing system 7.

In some embodiments, the position signal may be transmitted by the mobile electronic device 3 via Bluetooth, infrared communication, Wi-Fi, or other suitable communication signals.

In step S5, the computing system 7 may check the position of the mobile electronic device 3 again and determine whether it has been changed, for example, while the motor vehicle 2 has been moving from a parking position to the boarding position.

In step S6, the computing system 7 may select one of at least two windows 4a, 4b, 4c, 4d of the motor vehicle 2, such that the selected window is most suitable for displaying the visual content 1 depending on the position of the user 6. For example, when the user 6 is standing on a left side of the motor vehicle 2, the computing system 7 may select a left side window 4a of the motor vehicle 2, as shown schematically in FIG. 2, or, if the user 6 is standing on a right side of the motor vehicle 2, the computing system 7 may select a right side window 4b of the motor vehicle 2, as shown schematically in FIG. 3.

In some embodiments, the computing system 7 may select the window according to or depending on the position signal or the updated position signal of the mobile electronic device 3. In some embodiments, the computing system 7 may send a request signal to the mobile electronic device 3 to trigger the mobile electronic device 3 to generate and transmit the position signal or the updated position signal. The position of the mobile electronic device 3 may be understood as a relative position with respect to the motor vehicle 2. In other words, the window may be selected by the computing system 7 in a way that the user 6 is provided with a free view to the respective selected window of the motor vehicle 2.

In some embodiments, the computing system 7 may retrieve map information from a map database, which is, for example, stored on a storage element of the computing system 7, and select the window depending on the map information. The computing system 7 may determine from the map information, which side or which window of the motor vehicle 2 may be most suitable for displaying the visual content. To this end, the computing system 7 may, for example, take into account a probable position and orientation of the motor vehicle 2 when located in the boarding position and the user 6.

Depending on the selected window, the computing system 7 may adjust a light emission direction of a projection arrangement 5 of the motor vehicle 2 in order to project the visual content 1 on the selected window. In several embodiments, the projection arrangement 5 may comprise one or more light emitting units. The projection arrangement 5 may also comprise a driver unit to generate driver signals for the light emitting units depending on control data, which is generated by the computing system 7 depending on the visual content data and the selected window. Finally, the projection arrangement 5 may also comprise controllable optics, such as mirrors and/or lenses, to deflect light emitted by the light emitting units, in order to generate the visual content 1 and project it on the selected window.

In some embodiments, for changing or adjusting the light emission direction of the projection arrangement 5, the orientation of the whole projection arrangement 5, in particular the whole device including the optics and the light emitting units, may be changed or rotated. To this end, a motor and a drive of the projection arrangement 5 may be used.

In other embodiments, the light emission direction of the projection arrangement 5 may be adjusted by changing an orientation of the optics of the projection arrangement 5 or by using different light emitting units.

By adjusting the light emission direction and/or the orientation of the projection arrangement 5 depending on the selected window, the projection arrangement 5 may be put into the right position to project the visual content 1 on the particular selected window. In step S8, the projection arrangement 5 may then be controlled depending on the control data by the computing system 7 to project the visual content on the selected window.

Figure 4:
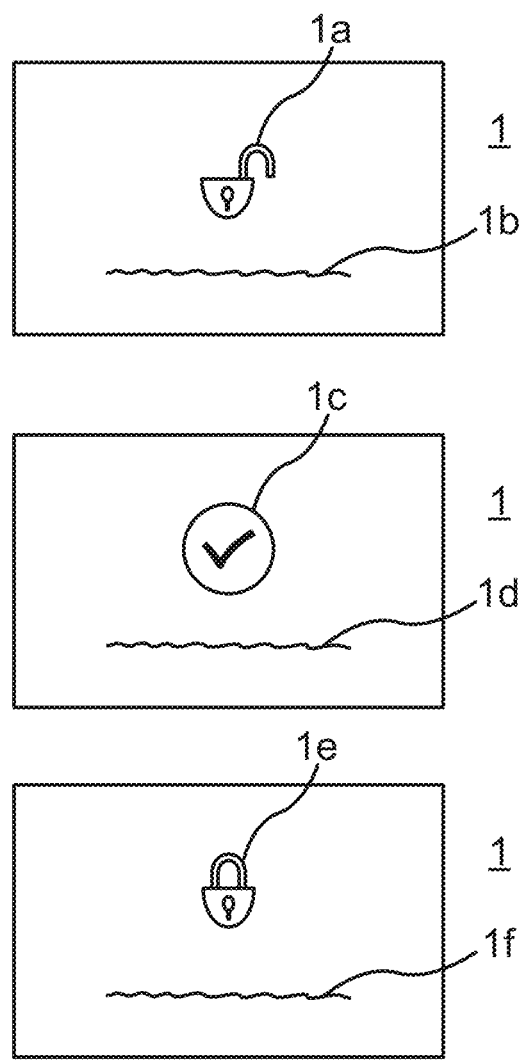
FIG. 4 shows several schematic examples for visual content.

FIG. 4 shows several examples for the visual content 1 that may be displayed on the selected window.

In the upper and panel of FIG. 4, an open lock symbol 1a is shown as well as a text portion 1b. The middle panel of FIG. 4 shows a check symbol 1c and also a text portion 1d. The text portions 1b, 1d may for example comprise a salutation directed to the user 6. The lower panel of FIG. 4 shows a closed lock symbol 1e and a further text portion 1f. The text portion 1f may for example inform the user 6 that the motor vehicle 2 cannot be accessed yet and/or when access to the motor vehicle 2 will be granted.

Figure 5:
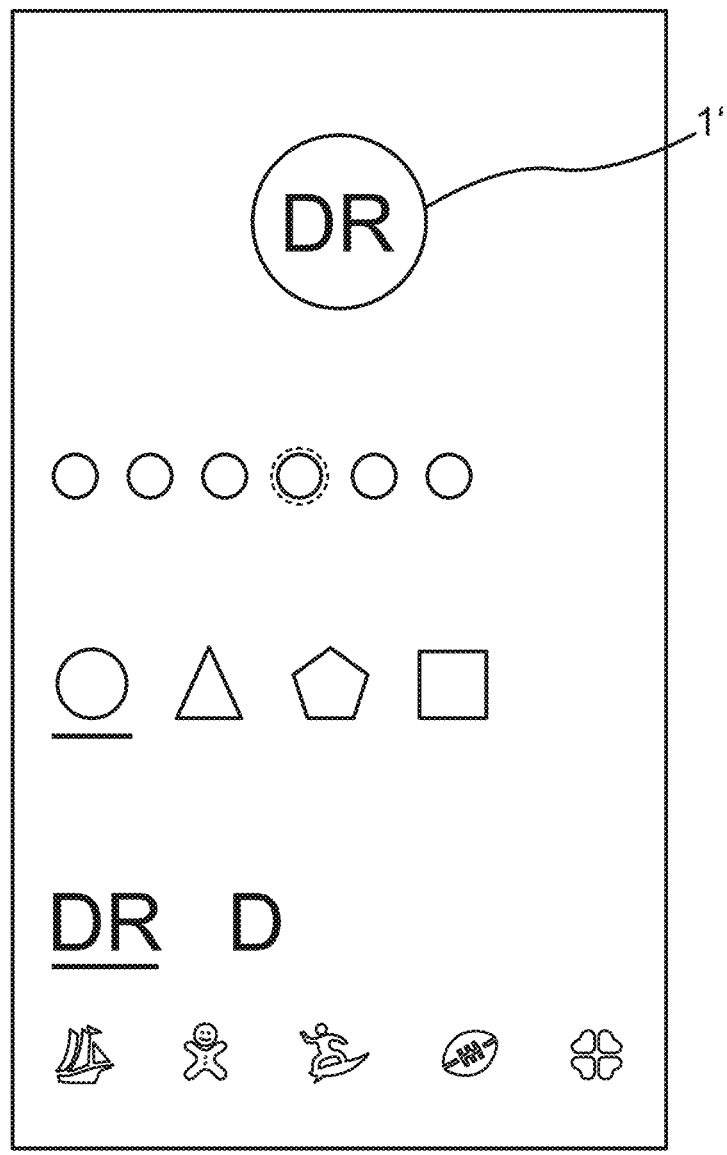
FIG. 5 shows a user interface of a mobile electronic device in an exemplary embodiment.

FIG. 5 shows an exemplary user interface of the mobile electronic device 3 that can be used to customize the visual content 1. For example, the user 6 may select his or her initials 1' or another symbol to be displayed. In some embodiments, the user 6 may select a shape of a contour for the initials 1' or symbol, such as a circle or a polygon. In some embodiments, the user 6 may select a color of the contour and/or the initials 1' or symbol.

Figure 6:
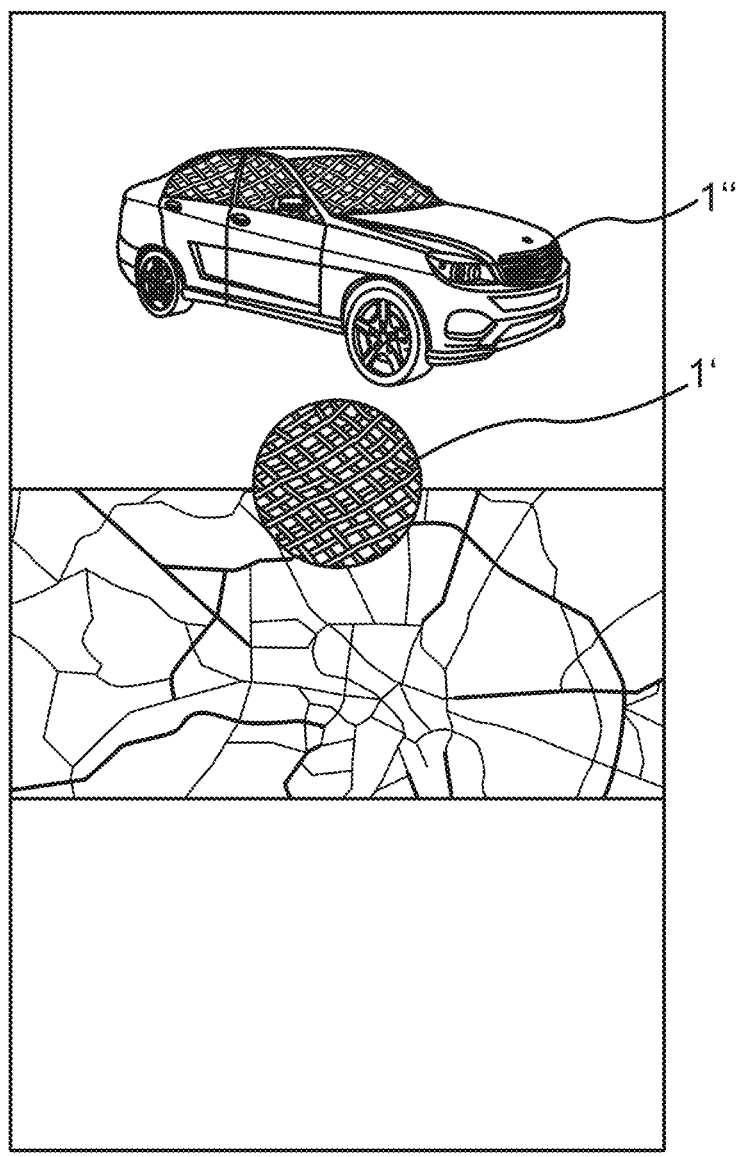
FIG. 6 shows a user interface of the mobile electronic device in a further exemplary embodiment, and FIG. 7 a further example for visual content.

FIG. 6 shows a further exemplary user interface of the mobile electronic device 3 that can be used to customize the visual content 1. For example, the user interface may display a representation of a pattern 1" to be displayed on the motor vehicle 2. Furthermore, an image 1''' of the motor vehicle 2 with the pattern 1" may be shown.

Figure 7:
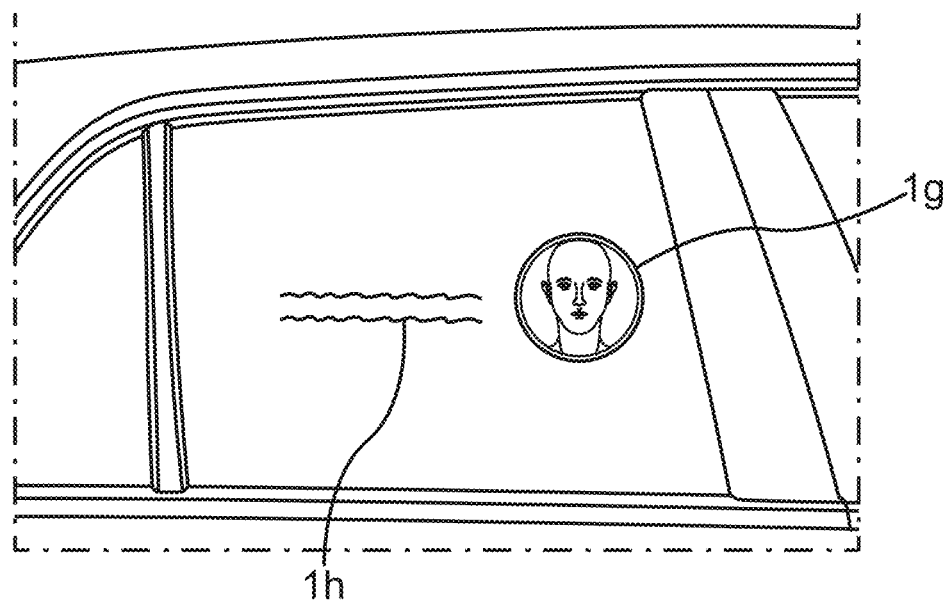

FIG. 7 shows a further example for the visual content 1, comprising an image 1g of the user 6 accompanied by a text portion 1h, which may, for example, comprise potential or planned route information and/or booking information.

As described, the various aspects of the invention allow the user 6 to easily identify a motor vehicle 2 amongst others. In some embodiments, control may be given to the user 6 to customize the visual content 1 and also may take into account the location of the user 6 to choose the ideal window to show the visual content 1. When the vehicle approaches the user 6, for example controlled automatically, the window may be automatically selected and the customized visual content may be displayed.

In some embodiments, for requesting the motor vehicle 2, the user 6 may open his mobile phone or another mobile electronic device 3, enter a destination and then is provided with a user interface allowing him to choose a customized visual content. The user 6 may for example select amongst different colors, shapes and/or symbols for the visual content 1. The user 6 may select his or her initials or name or choose a pattern from a set of predefined available options. The user 6 may also choose his or her favorite color for the initials or add another outer contour of the symbol or add another icon or the like. The mobile electronic device 3 then sends the user request to the computing system 7 as described. As shown in FIG. 6, the user interface may also show the vehicle 2 together with a further representation 1" of the selected visual content 1 in various alternative ways on a screen of the mobile electronic device 3. As the motor vehicle 2 approaches the user 6, it may send a signal to the mobile electronic device 3 and the mobile electronic device 3 may signal that the motor vehicle 2 has arrived to the user 6, for example, by generating a haptic or visual or acoustic signal. Depending on the position of the user 6, obtained via the position of the mobile electronic device 3 or the map information, the projection arrangement 5 may rotate to the optimal window and send the projections on the side of the window the user 6 would be to display the visual content 1. The user 6 can then look at the visual content 1, for example his or her initials and/or custom pattern, and access the motor vehicle 2. In this way, the motor vehicle 2 is also able to personally greet the user 6 and the user 6 can easily find the motor vehicle 2. The user 6 can easily distinguish the intended motor vehicle 2 from others. Since the user 6 has actually selected the visual content 1, the user 6 may easily remember and look out for the selected visual content 1 to save time and effort.

In some embodiments, the motor vehicle 2 is a fully automatically drivable vehicle, which may, upon the user request, be moved fully automatically from a parking position to a boarding position, where the user 6 may wait to enter the motor vehicle 2. Since no human driver may be involved, the user 6 may easily identify the motor vehicle 2 among other vehicles. Furthermore, for example by customizing the visual content 1, the user 6 may easily confirm that the respective motor vehicle 2 is actually the right vehicle, without needing support of another person.

In some embodiments, the mobile electronic device 3 may be designed as a handheld electronic device, a mobile phone, a smartphone, a handheld computer, a tablet computer, a laptop computer and so forth.

In an embodiment, the system 8 for displaying visual content comprises the mobile electronic device 3.

In an embodiment, the user request data comprises data concerning an intended use of the motor vehicle 2 and the visual content data is determined by the computing system 7 depending on the data concerning the intended use. The visual content data is determined by the computing system 7 depending on data concerning the identity of the user 6, which is comprised by the user request. The data concerning the intended use may for example comprise an intended route and/or an intended time of use Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for displaying visual content on a motor vehicle, the method comprising:
   receiving, by a computing system from a mobile electronic device, a user request data;
   determining, by the computing system depending on the user request, visual content data representing the visual content;
   selecting, by the computing system, a window from at least two windows of the motor vehicle;
   generating, by the computing system, control data depending on the visual content data and the selected window; and
   controlling a projection arrangement of the motor vehicle depending on the control data to project the visual content on the selected window, wherein the method further comprises
receiving, by the computing system, a position signal representing a position of the mobile electronic device; and
selecting, by the computing system, the window from the at least two windows of the motor vehicle depending on the position or the position signal, and wherein the method further comprises
adjusting a light emission direction of the projection arrangement depending on the position, the position signal, or the selected window to project the visual content on the selected window; or
adjusting an orientation of the projection arrangement depending on the position, the position signal, or the selected window to project the visual content on the selected window.

2. The method of claim 1, further comprising:
receiving, by the mobile electronic device, a user input concerning the visual content;
generating, by the mobile electronic device, the user request data depending on the user input; and
determining, by the computing system, the visual content data depending on the user input.

3. A method for displaying visual content on a motor vehicle, the method comprising:
receiving, by a computing system from a mobile electronic device, a user request data;
determining, by the computing system depending on the user request, visual content data representing the visual content;
selecting, by the computing system, a window from at least two windows of the motor vehicle;
generating, by the computing system, control data depending on the visual content data and the selected window; and
controlling a projection arrangement of the motor vehicle depending on the control data to project the visual content on the selected window,
wherein the method further comprises
retrieving map, by the computing system, information from a map database; and
selecting, by the computing system, the window from the at least two windows of the vehicle depending on the map information.

4. A method for displaying visual content on a motor vehicle, the method comprising:
receiving, by a computing system from a mobile electronic device, a user request data;
determining, by the computing system depending on the user request, visual content data representing the visual content;
selecting, by the computing system, a window from at least two windows of the motor vehicle;
generating, by the computing system, control data depending on the visual content data and the selected window; and
controlling a projection arrangement of the motor vehicle depending on the control data to project the visual content on the selected window,
wherein the method further comprises
determining that the user request data comprises data concerning an intended use of the motor vehicle and the visual content data is determined by the computing system depending on the data concerning the intended use; or
determining, by the computing system, the visual content data depending on data concerning an identity of the user, which is comprised by the user request data.

5. A method for providing a motor vehicle to a user, the method comprising:
receiving, by a computing system from a mobile electronic device, user request data;
determining, by the computing system depending on the user request, visual content data representing the visual content;
receiving, by the computing system, a position signal representing a position of the mobile electronic device;
controlling, by an electronic vehicle guidance system, the motor vehicle to move automatically to a boarding position depending on the position signal or the position of the mobile electronic device;
selecting, by the computing system, a window from at least two windows of the motor vehicle;
generating, by the computing system, control data depending on the visual content data and the selected window; and
controlling a projection arrangement of the motor vehicle depending on the control data to project the visual content on the selected window,
wherein the method further comprises
selecting, by the computing system, the window from the at least two windows of the motor vehicle depending on the position or the position signal; or
receiving, by the computing system, a further position signal representing an updated position of the mobile electronic device and selecting, by the computing system, the window from the at least two windows of the motor vehicle depending on the updated position or the further position signal.

6. A system for displaying visual content on a motor vehicle, the system for displaying visual content comprising:
a computing system with a communication interface configured to receive user request data from a mobile electronic device, wherein the computing system is configured to
determine visual content data representing the visual content depending on the user request;
select a window from at least two windows of the motor vehicle; and
generate control data depending on the visual content data and the selected window; and
a projection arrangement for the motor vehicle, which is mountable to the motor vehicle and configured to project the visual content on the selected window depending on the control data, wherein
the projection arrangement is configured to adjust a light emission direction of the projection arrangement to project the visual content on the selected window; or
the projection arrangement is configured to adjust an orientation of the projection arrangement to project the visual content on the selected window.

* * * * *